United States Patent
Chatra et al.

(10) Patent No.: US 8,788,490 B1
(45) Date of Patent: Jul. 22, 2014

(54) LINK BASED LOCALE IDENTIFICATION FOR DOMAINS AND DOMAIN CONTENT

(75) Inventors: Abhiman Chatra, Udupi (IN); Sreeram Ramachandran, Coimbatore (IN)

(73) Assignee: Google Inc., Mountain View, CA (US)

( * ) Notice: Subject to any disclaimer, the term of this patent is extended or adjusted under 35 U.S.C. 154(b) by 480 days.

(21) Appl. No.: 12/492,836

(22) Filed: Jun. 26, 2009

Related U.S. Application Data

(60) Provisional application No. 61/076,394, filed on Jun. 27, 2008.

(51) Int. Cl.
*G06F 7/00* (2006.01)
*G06F 17/30* (2006.01)

(52) U.S. Cl.
CPC .................. *G06F 17/3053* (2013.01)
USPC ....................................................... 707/726

(58) Field of Classification Search
CPC .................................. G06F 17/3053
USPC ....................................................... 707/726
See application file for complete search history.

(56) References Cited

U.S. PATENT DOCUMENTS

| | | | |
|---|---|---|---|
| 5,265,065 A | 11/1993 | Turtle | |
| 5,410,688 A | 4/1995 | Williams et al. | |
| 6,285,999 B1 | 9/2001 | Page | |
| 6,321,227 B1 | 11/2001 | Ryu | |
| 6,449,765 B1 | 9/2002 | Ballard | |
| 6,526,440 B1 | 2/2003 | Bharat | |
| 6,601,100 B2 | 7/2003 | Lee et al. | |
| 6,745,248 B1 | 6/2004 | Gardos et al. | |
| 6,954,755 B2 | 10/2005 | Reisman | |
| 7,039,697 B2 | 5/2006 | Bayles | |
| 7,062,488 B1 | 6/2006 | Reisman | |
| 7,257,570 B2 | 8/2007 | Riise et al. | |
| 7,269,643 B2 | 9/2007 | Spaid | |
| 7,359,987 B2 | 4/2008 | Stahura | |
| 7,389,289 B2 | 6/2008 | Solaro et al. | |
| 7,403,939 B1 | 7/2008 | Virdy | |
| 7,472,160 B2 | 12/2008 | King et al. | |
| 7,543,055 B2 | 6/2009 | Kohn | |
| 7,680,796 B2 | 3/2010 | Yeh et al. | |
| 7,747,598 B2 | 6/2010 | Buron et al. | |
| 7,844,590 B1 | 11/2010 | Zwicky et al. | |
| 8,046,350 B1 | 10/2011 | Singhal et al. | |

(Continued)

OTHER PUBLICATIONS

Zhisheng et al., "Indexing implicit locations for geographical information retrieval," 2006, ACM, pp. 1-3.

(Continued)

*Primary Examiner* — Apu Mofiz
*Assistant Examiner* — Ajith Jacob
(74) *Attorney, Agent, or Firm* — Fish & Richardson P.C.

(57) ABSTRACT

Methods, systems, and apparatus, including computer programs encoded on computer storage media, for link based locale identification for domains and domain content. In one aspect, a computer-implemented method includes identifying a plurality of domains including a first domain and one or more other domains, the other domains including one or more resources that link to the first domain. The method further includes detecting one or more indicators in the resources that link to the first domain, the indicators collectively identifying a number of locales. The method further includes determining one or more link based locale scores for the first domain using the indicators in the resources that link to the first domain. The method further includes storing the link based locale scores.

27 Claims, 6 Drawing Sheets

(56) References Cited

U.S. PATENT DOCUMENTS

| | | | |
|---|---|---|---|
| 8,200,694 B1 | 6/2012 | Diligenti et al. | |
| 2002/0156905 A1 | 10/2002 | Weissman | |
| 2002/0161901 A1 | 10/2002 | Weissman | |
| 2002/0173946 A1 | 11/2002 | Christy | |
| 2003/0009592 A1 | 1/2003 | Stahura | |
| 2003/0097357 A1 | 5/2003 | Ferrari et al. | |
| 2004/0019588 A1 | 1/2004 | Doganata et al. | |
| 2004/0111508 A1 | 6/2004 | Dias et al. | |
| 2005/0044065 A1 | 2/2005 | McArdle | |
| 2005/0044139 A1 | 2/2005 | Christian et al. | |
| 2005/0055708 A1 | 3/2005 | Gould et al. | |
| 2005/0065916 A1 | 3/2005 | Ge et al. | |
| 2005/0071465 A1 | 3/2005 | Zeng et al. | |
| 2005/0125391 A1 | 6/2005 | Curtis et al. | |
| 2005/0154716 A1 | 7/2005 | Watson et al. | |
| 2005/0203875 A1 | 9/2005 | Mohammed et al. | |
| 2006/0041562 A1 | 2/2006 | Paczkowski et al. | |
| 2006/0161534 A1 | 7/2006 | Carson et al. | |
| 2006/0262786 A1 | 11/2006 | Shimizu et al. | |
| 2006/0271531 A1* | 11/2006 | O'Clair et al. | 707/5 |
| 2006/0287936 A1 | 12/2006 | Jacobson | |
| 2006/0287985 A1 | 12/2006 | Castro et al. | |
| 2007/0011168 A1 | 1/2007 | Keohane et al. | |
| 2007/0043816 A1 | 2/2007 | Ishibashi | |
| 2007/0050586 A1 | 3/2007 | Shin et al. | |
| 2007/0050708 A1 | 3/2007 | Gupta et al. | |
| 2007/0083505 A1 | 4/2007 | Ferrari et al. | |
| 2007/0234116 A1 | 10/2007 | Yoshikawa et al. | |
| 2007/0234216 A1 | 10/2007 | Fitzpatrick et al. | |
| 2007/0234351 A1 | 10/2007 | Iyoda et al. | |
| 2007/0239713 A1 | 10/2007 | Leblang et al. | |
| 2007/0283273 A1 | 12/2007 | Woods | |
| 2007/0283422 A1 | 12/2007 | Iyoda et al. | |
| 2007/0294391 A1 | 12/2007 | Kohn | |
| 2008/0005104 A1 | 1/2008 | Flake et al. | |
| 2008/0005127 A1 | 1/2008 | Schneider | |
| 2008/0010273 A1 | 1/2008 | Frank | |
| 2008/0021874 A1 | 1/2008 | Dahl et al. | |
| 2008/0052358 A1 | 2/2008 | Beaven et al. | |
| 2008/0059607 A1 | 3/2008 | Schneider | |
| 2008/0109553 A1 | 5/2008 | Fowler | |
| 2008/0133612 A1 | 6/2008 | Liu et al. | |
| 2008/0172344 A1 | 7/2008 | Eager et al. | |
| 2008/0172374 A1 | 7/2008 | Wolosin et al. | |
| 2008/0189290 A1 | 8/2008 | Kim et al. | |
| 2008/0195603 A1 | 8/2008 | Gross et al. | |
| 2008/0209552 A1 | 8/2008 | Williams et al. | |
| 2008/0222307 A1 | 9/2008 | Bhakta et al. | |
| 2008/0243821 A1 | 10/2008 | Delli Santi et al. | |
| 2008/0250136 A1 | 10/2008 | Izrailevsky et al. | |
| 2008/0294602 A1 | 11/2008 | Permandla et al. | |
| 2008/0317217 A1 | 12/2008 | Bernardini et al. | |
| 2009/0012866 A1 | 1/2009 | Celik et al. | |
| 2009/0077221 A1 | 3/2009 | Eisenstadt et al. | |
| 2009/0196122 A1 | 8/2009 | Crowell | |
| 2010/0287049 A1 | 11/2010 | Rousso et al. | |

OTHER PUBLICATIONS

Hursh, "Local Search: The Relevance Dilemma," Jan. 18, 2007, ClickZ, pp. 1-3.

* cited by examiner

LINK BASED LOCALE IDENTIFICATION FOR DOMAINS AND DOMAIN CONTENT

CROSS-REFERENCE TO RELATED APPLICATIONS

This application claims priority to U.S. Application Ser. No. 61/076,394, filed on Jun. 27, 2008, and entitled, "Link Based Locale Identification for Domains and Domain Content."

BACKGROUND

This specification relates to link based locale identification for domains and domain content.

A search service, e.g., a web-based search service, will generally receive a search query from a user through a user interface presented to the user by the service through a web browser on a personal computing device. Upon receiving a search query, a search service will generally direct the search query to a search engine for a specific corpus of resources. A search engine produces results based on the query. The search engine initially ranks the results according to one or more criteria including the relevance of the results to the query in the context of the corpus to which the query was directed.

A Uniform Resource Locator (URL) is a string of characters that identifies a resource (e.g., an addressable web document or file) on a computer network. A URL provides a means for locating a resource by describing the resource's location on the network. Each URL includes a hostname. A hostname is a unique name by which a network naming system identifies a particular device or group of devices that are attached to the network. Each hostname is associated with at least one Internet Protocol (IP) address.

Each hostname ends in a top level domain name. The top level domain name can be, for example, a generic top level domain name, e.g., ".com" or ".gov". Alternatively, the top level domain name can be a country code top level domain (ccTLD) name, e.g., ".fr" or ".ca", which identifies the country in which the name was registered. Hostnames also include a second level domain name immediately to the left of the top level domain name. The second level domain name can indicate a particular organization that is associated with the content on the domain. For example, the hostname "www.random.com" may indicate that the content is associated with an organization named Random, Inc. Hostnames having the same second level domain name but different top level domain names may be unrelated: for example, "www.random.be" and "www.random.com" may well be associated with distinct organizations.

Each resource identified in the results produced by the search engine may include one or more of the following attributes: a title of a webpage, a hyperlink to the webpage, a snippet of text showing search terms in bold, the size of the webpage, a hyperlink to similar web pages, and a hyperlink to a cached version of the webpage. After the search engine produces the results, the search service presents those search results to the user.

The identified resources correspond to one or more domains. In this specification, the term "domain" will be used to refer to the collection of Internet resources that are addressable through URLs sharing the same hostname. A domain may include a very large number of resources and Internet Protocol (IP) addresses, or it may include only a few resources and a single IP address. Under this definition, a domain will always be identified using its hostname: the hostname "www.random.com", for example, will be used to indicate those resources addressable through that hostname.

SUMMARY

This specification describes link based locale identification for domains and domain content.

In a first aspect, a computer-implemented method for link based locale identification includes identifying a plurality of domains including a first domain and one or more other domains, the other domains including one or more resources that link to the first domain. The method further includes detecting one or more indicators in the resources that link to the first domain, the indicators collectively identifying a number of locales. The method further includes determining one or more link based locale scores for the first domain using the indicators in the resources that link to the first domain. The method further includes storing the link based locale scores.

Implementations can include any, all, or none of the following features. Determining the link based locale scores for the first domain can include calculating values for the indicators in the resources that link to the first domain and determining locale scores for the resources that link to the first domain based on the calculated values. Determining the locale scores for the resources that link to the first domain can further include combining the calculated values of the indicators. Combining the calculated values for the indicators can include applying a weight to each calculated value. The method can include determining locale scores for the first domain by calculating values for indicators in one or more resources of the first domain and combining the locale scores for the first domain with the linked based local scores for the first domain. The method can include receiving a search query from a user, and adjusting a position of a resource from the first domain in an ordered list of search results based on the combined scores and an inferred locale of a user. Detecting the indicators can include detecting the indicators in dynamic user click data. Detecting the indicators can include detecting the indicators in dynamic traffic data for a plurality of users on the first domain. Detecting the indicators can include detecting the indicators in a dynamic explicit identification of one or more locales. Detecting the indicators can include detecting the indicators in content associated with the resources that link to the first domain. The method can include receiving an initial search output resulting from a user search query. The search output can include an ordered list of search results. Each member of the ordered list of search results can correspond to a domain. The user can have an inferred locale. The method can include identifying first domains within the ordered list of search results for which link based locale scores have been determined and adjusting a position of one or more of the members of the ordered list of search results corresponding to the first domains within the ordered list of search results based on the inferred locale of the user.

In a second aspect, a computer-implemented system for link based locale identification includes an interface that allows identification of a plurality of domains including a first domain and one or more other domains, the other domains including one or more resources that link to the first domain. The system further includes a link module that detects one or more indicators in the resources that link to the first domain, the indicators collectively identifying a number of locales. The system further includes a locale module that determines one or more link based locale scores for the first domain using the indicators in the resources that link to the first domain. The system further includes a memory that stores the link based locale score information.

Implementations can include any, all, or none of the following features. The system can include a search engine that provides an ordered list of search results from the plurality of domains in response to receiving a user search query that can be associated with an inferred locale, and that adjusts a position of a resource from the first domain in the ordered list of search results based on the link based locale score information and the inferred locale of the user. The resources can be web pages.

The systems and techniques described here may provide one or more of the following advantages. A domain's relevance to one more particular geographical locales can be determined, as well as the relative level of relevance to each locale. Thus, a given domain can be determined as being more or less relevant to one or more locales. Similarly, the relevance of individual resources to particular locales, and the relevance of content within the resources, can be determined. Relevance to a particular locale can be determined without relying on potentially inaccurate or misleading static data. Specific results to a user search query can be promoted if the corresponding domains or resources are relevant to locales associated with the user's locale. Locale relevance information can be used to improve country restrict capabilities of, e.g., commercial search engines. Locale relevance information can also be used to implement country-specific vertical search engines.

The details of one or more embodiments of the subject matter described in this specification are set forth in the accompanying drawings and the description below. Other features and advantages of the link based locale identification for domains and domain content will be apparent from the description and drawings, and from the claims.

DESCRIPTION OF DRAWINGS

Like reference symbols in the various drawings indicate like elements.

DETAILED DESCRIPTION

Figure 1:
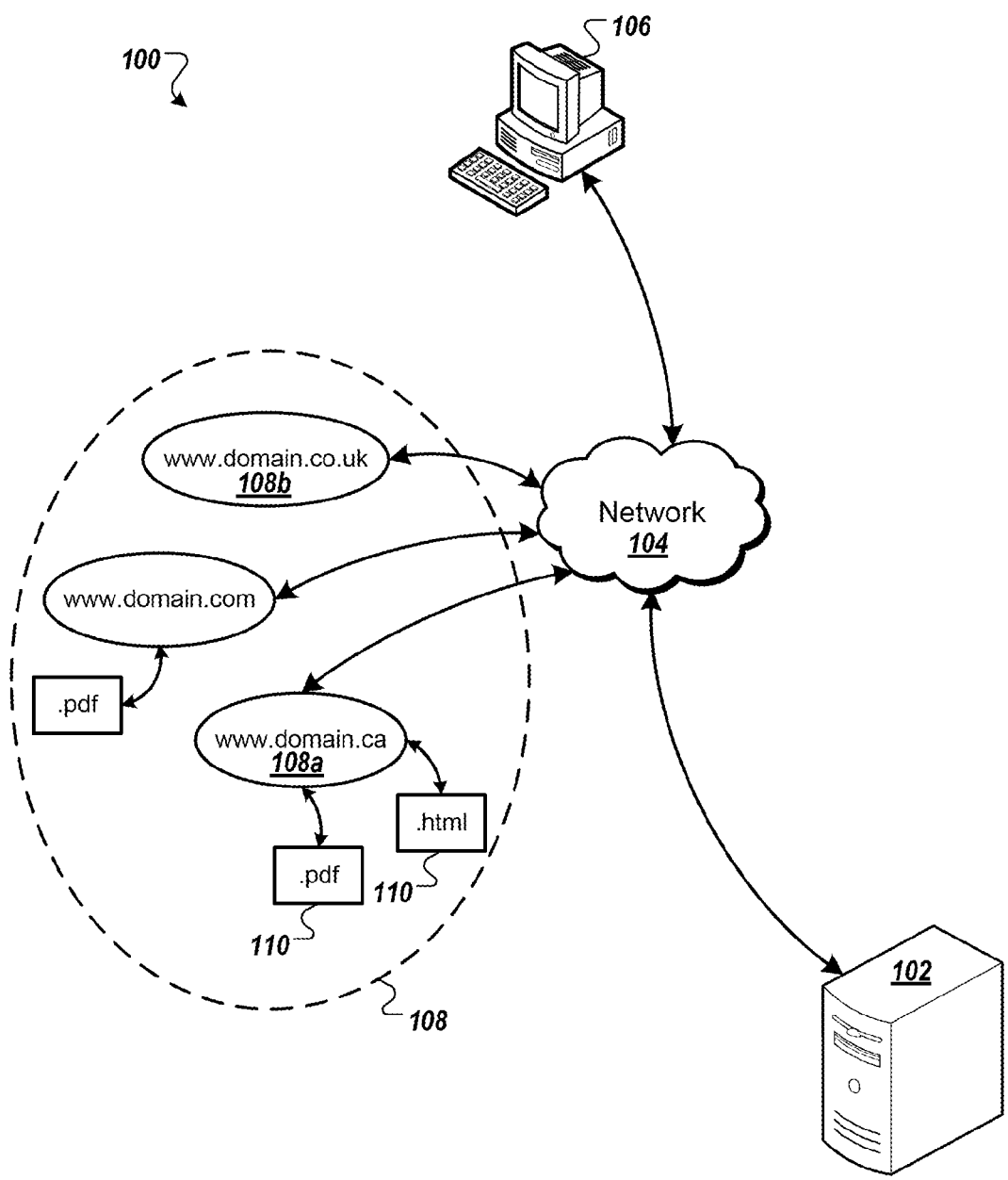
FIG. 1 is a block diagram showing an example of a system for link based locale identification.

FIG. 1 is a block diagram showing an example of a system 100 for link based locale identification. The system 100 includes a locale identification system 102 connected to a network 104. The locale identification system 102 can be, e.g., a web server that includes a search engine system. The network 104 can include one or more networks. The locale identification system 102 communicates with a client 106 over the network 104. Although the client 106 and the locale identification system 102 are illustrated in FIG. 1 as singular entities, any suitable number of clients and locale identification systems may be connected through the network 104.

The locale identification system 102 communicates with one or more domains 108 over the network 104. Each of the domains 108 is associated with a hostname that maps to one or more corresponding Internet Protocol (IP) addresses. For clarity, this specification will identify each of the domains 108 using its distinct hostname.

Each of the domains 108 generally includes a number of resources. These resources can include any objects addressable over a network, e.g., web pages, electronic documents, and images. For example, a "www.domain.ca" domain 108a in FIG. 1 includes multiple resources 110. The resources 110 can be dynamic, e.g., dynamic web pages or hypertext markup language (HTML) documents. Alternatively, the resources 110 can be static, e.g., portable document format (PDF) documents.

Each of the domains 108 can be relevant to one or more locales. Locales correspond to geographical areas. In some implementations, a locale is a country or any formal or informal subdivision of a country (e.g., state, zone, province, county, city, municipality, district, etc.). In other implementations, locales also include groups of countries (e.g., political unions of countries, groups of countries having a common cultural heritage, countries within a particular area, etc.).

Each of the resources 110 can include one or more indicators that the locale identification system 102 uses to identify one or more locales relevant to the resource. Indicators can include static information. For example, the locale identification system 102 can identify locales according to the static indicators including information about the physical location of the server, e.g., the server's IP address.

Static indicators can also include hostname ownership or registration information. In some implementations, the locale identification system 102 identifies locales corresponding to the country code top-level domain (ccTLD) names of domains hosted on the server. For example, the hostname corresponding to "www.random.ca" includes a ccTLD name ".ca", which is a static indicator identifying the locale of Canada. In other implementations, the locale identification system 102 accesses a database (e.g., using a protocol such as WHOIS) to determine the owner of a hostname. The locale identification system 102 infers a locale for the domain corresponding to the locale of the registrant entity, e.g., the entity's area of incorporation or principal place of business. If the registrant of "www.random.ca" is listed as having an address in Toronto, for example, the system can identify Toronto as a relevant locale.

Alternatively, indicators can include dynamic information relating to, e.g., user information, web traffic information, and document content. Dynamic indicators can include user information. In some implementations, the locale identification system 102 examines user click data to identify locales. For example, the locale identification system 102 can identify locales corresponding to the locales of users clicking on a particular web page or resource in a domain. The locale identification system 102 can also explicitly ask users to provide locale information.

Dynamic indicators can include explicit user feedback and Webmaster feedback. Users and Webmasters can be directly queried about a domain's relevance to a particular locale. Additionally, Webmasters can specify particular locales to which the domain relates. For example, Webmasters can specify related locales during the domain registration process or when updating site content.

Dynamic indicators can include web traffic information. For example, the locale identification system 102 can examine Internet Service Provider (ISP) traffic logs to determine which domains are referring users to the first domain, i.e., which domains users are accessing the first domain from. The locale identification system 102 identifies locales associated with the referral domains by, for example, examining the indicators in each referral domain.

Dynamic indicators can also include content information associated with a domain's resources. In some implementations, the locale identification system 102 examines anchor text in a resource and identifies locales associated with domains the anchor text links to. In other implementations, the locale identification system 102 detects locales identified by metadata or tags in a resource. In other implementations, the locale identification system 102 detects locales identified by the URL of the resource. For example, the locale identification system 102 can examine the URL of a website "www.random.com/france/" and determine that the resource is associated with France.

In still other implementations, the locale identification system 102 detects keywords explicitly identifying locales. The locale identification system 102 can detect proper nouns in page text explicitly identifying locales (the locale identification system 102 could interpret the keywords "Paris" and "France," for example, as explicitly identifying the locale of France). The locale identification system 102 can also detect capitalized words in resource text and compare those words to an index containing proper nouns typical of a particular locale (e.g., common last names, landmarks, and holidays). The locale identification system 102 can also detect keywords in page text that are characteristic of a locale. In some implementations, the locale identification system 102 can maintain an index of terms characteristic of a particular locale and can determine that a domain containing a threshold number of characteristic keywords for a locale is relevant to that locale. For example, "tea," "queen," and "beefeater" can be characteristic keywords for the United Kingdom of Great Britain and Northern Ireland (U.K.).

The locale identification system 102 can calculate values for the indicators that signify the strength with which the indicator identifies a particular locale. The locale identification system 102 can adjust indicator values to account for, e.g., the reliability or quality of the indicator information. Indicator values can be scaled relative to other indicators in the same domain, and can be normalized: for example, the locale identification system 102 can calculate indicator values for the indicators in a single domain that range from "0.0" to "1.0".

A resource may or may not include the same indicators associated with its parent domain (i.e., the domain that the resources are hosted on). For example, an indicator may be included in the parent domain but not in the particular resource, e.g., if the indicator is contained within another resource on the domain; a streaming media file, for example, will not include keyword indicators that may be included in a PDF document on the same domain. Alternatively, a resource can include the same indicators as the parent domain, e.g., if a domain's indicators are contained within the resource. Therefore, the resources 110 can be relevant to locales that are the same as or different from the locales related to their parent, the "www.domain.ca" domain 108a. The resources of the domains 108 are addressable by the locale identification system 102 and the client 106 over the network 104.

Domains can be local domains, i.e., domains relevant to one or a limited number of distinct locales. A domain's hostname can have a ccTLD name indicating that the domain was registered in a particular geographical location: for example, the "www.domain.ca" domain 108a has the top-level domain name ".ca", indicating that the hostname was registered in Canada and, consequentially, suggesting that the domain may be physically hosted in Canada. Domain resources can be targeted toward users from one or more particular locales, e.g., by presenting content in a particular language, advertising for local businesses, or providing updates on area events. If resources on the "www.domain.ca" domain 108a present content in French, the domain may be associated with Québec and with any other French-speaking locales, such as France or Guadeloupe. Domains can be associated with a particular geographical location even if their hostnames have ccTLD names corresponding to a different country or do not have ccTLD names at all. For example, a "www.domain.co.uk" domain 108b may be associated with Ireland if it includes content relating to events occurring in Dublin, even though the hostname does not have the Irish top-level domain name ".ie".

A local domain can be assigned one or more locale scores corresponding to locales to which the domain is relevant. For example, a domain that is relevant only to Canada can be assigned a Canada score. A domain that is relevant to both Canada and the United States of America (U.S.) can be assigned both a Canada score and a U.S. score.

Domains can be relevant to a region, i.e., a particular grouping of two or more locales, and can be assigned regional locale scores. Regions can be defined according to various different criteria. In some implementations, the locale identification system 102 defines regions to include locales grouped according to geography. For example, the locale identification system 102 can define a European Union region including locales corresponding to the member countries of the European Union: if a domain has the ccTLD name ".eu", the locale identification system 102 identifies it as being associated with the European Union and assigns the domain a European Union score. In other implementations, the locale identification system 102 defines regions according to political associations. The locale identification system 102 can define a North American Free Trade Agreement (NAFTA) region including locales corresponding to the U.S., Canada, and Mexico, and can assign domains NAFTA scores if, for example, the domains have locale scores for one of the three NAFTA countries or include resources with content relating to NAFTA developments.

Locale scores for a domain indicate the degree to which that domain is relevant to a particular locale, as established by the indicators of the domain's resources. If the indicators show a strong association between the domain and a locale, the domain will have a relatively high locale score for that locale. A domain can be assigned separate locale scores for each locale identified by an indicator. Alternatively, a domain can be assigned locale scores for only select locales. For example, a domain can be assigned a locale score only if the domain satisfies a threshold degree of relevance to the locale or if the indicators identifying the locale satisfy a threshold level of reliability.

Domains can be global domains that are not relevant to any particular locale, or, alternatively, are relevant to all locales. A domain containing resources for an international corporation, for example, may not be associated with any particular locale (e.g., may include high-level or universally relevant content), or it may be relevant to all locales (e.g., may include content particularly directed to a large number of distinct locales). By designating the domain as being global, the locale identification system 102 accounts for the domain's universal relevance.

The locale identification system 102 can simultaneously designate a domain as being both global and local. In some cases, a domain may contain universally relevant content but may also be particularly interesting to, or heavily used by, users from a certain locale: an English-language travel website, for example, may have flight information for destinations across the world, but may be used predominantly by users in the U.S., U.K., and other English-speaking locales. The locale identification system 102 can decide to designate such a domain as being both global, to capture the universally-relevant nature of the content, and local, to reflect its apparent popularity with, e.g., U.S. users.

The locale identification system 102 can identify a domain as a global domain according to various criteria. In some implementations, the locale identification system 102 identifies as global those domains having a generic top-level domain name (e.g., ".com", ".org", ".net", and ".int"). In other implementations, the locale identification system 102 designates domains having more than a threshold number of locale scores as being global domains. For example, the system can designate a domain as global if the domain has at least five locale scores, i.e., is relevant to at least five different locales. In still other implementations, the system designates a domain as global if the domain has zero locale scores. For example, a domain including generic resources for an international organization can include indicators identifying a large number of locales, but the domain may be only moderately relevant to each individual locale. In this situation, the locale identification system 102 can assign the domain no locale scores because the domain does not satisfy a threshold level of relevance to any individual domain.

The client 106 is used by one or more users. The users use one or more applications on the client 106 in order to communicate with the locale identification system 102 and the domains 108. For example, the user on the client 106 can use a web browser application to submit a search query to a search engine. The user receives results to the search query from the locale identification system 102. The user can select one or more of the received results and can address associated content (e.g., by clicking on a link contained in the result).

Users can be associated with a locale. The user's locale can be any geographical location in which the user is likely to be physically located or in which the user is likely to be interested. In some implementations, the geographic location is non-specific, such as a city, state, or country, rather than a specific address or other specific geographic coordinates. The locale identification system 102 can infer the user's locale from information associated with or provided by the user. For example, the locale identification system 102 can communicate with the user's network access provider (e.g., the user's Internet Service Provider) to obtain location information. Alternatively, the locale identification system 102 can use information about the user's network connection by identifying an approximate geographical location for the user from the IP address corresponding to the user's client device (e.g., personal computer, mobile phone).

Additionally or alternatively, the system can infer the user location from the location of the search engine accessed by the user. For example, if the user provides a search query to an engine located in Italy—e.g., to "www.search.it"—the system can infer that the user location is Italy. The system can specifically query the user to provide location information or can access user profiles or accounts containing location information (e.g., a web browser cookie that stores location information or a server-side account that includes location information). The system can also infer a location from the user's language preferences (e.g., operating system language settings, the language of the search engine, or the language of the search query). The system can identify the approximate geographical location of the user from the IP address corresponding to the client device (e.g., personal computer, mobile phone) from which the user issues the search query.

The locale identification system 102 determines locale scores for the domains 108 using the indicators associated with the domains. The locale identification system 102 similarly determines locale scores for the resources 110 using the indicators associated with the resources. The locale identification system 102 can determine locale scores for the domains and resources according to various heuristics, as described in greater detail below.

The locale identification system 102 includes a search engine that provides an ordered listing of results in response to search queries received from the client 106. Each result can include, for example, a title, anchor text, and a URL identifying a particular resource. Each result also corresponds to a particular domain identified by the hostname in the URL. In addition, there may exist a number of other resources having links that refer to the resource identified in any particular result.

For example, the other resources can include links, such as HTML anchor tags (<a href="host.uk/resource.html">), inline frame tags (<iframe src="host.uk/resource.html">), or other data and/or meta data that links the other resources to the resource. The other resources can be located at the same content host or domain as the resource or at other content hosts or domains. The content hosts or domains of the other resources can be located within the same locale as the resource or another locale. The locale scores of the other resources can be determined in the same or a similar manner as was performed for the resource. The locale scores of the other resources that link to the resource can be used to determine one or more link based locale scores for the resource. The link based locale scores generated from the other resources can be used in combination with the one or more locale scores of the resource to determine overall or combined locale scores.

The locale identification system 102 determines locale scores for results within the ordered listing of results, i.e., determines locale scores for domains corresponding to the results, and stores the determined locale scores. In some implementations, the locale identification system 102 determines locale scores in real time as search results for a query are provided. In other implementations, the locale identification system 102 determines locale scores offline, e.g., prior to or non-responsive to a particular user query. The locale identification system 102 can store the locale stores in a searchable index such that, for a given domain, the locale identification system 102 can use the index to identify locale scores for the domain. The index can be implemented as any appropriate data structure.

In addition, the searchable index can include link information that identifies resources having links that refer to a particular domain or resource. The locale scores of the referring resources can be used to generate a link based locale score for a resource to which the other resources refer. For example, the locale scores of the referring resources can be averaged to generate the link based locale score for the resource being referred to. The average of the locale scores can be weighted based on confidence values for each of the locale scores of the referring resources. The link based local score of the referred resource can be combined with a locale score determined from the contents of the referred resource and other dynamic information as previously described. For example, the locale score and the linked based locale score can be combined by adding the scores or by multiplying the scores. In another example, the scores can be combined by calculating an average of the scores. In some implementations, the locale score and/or the link based locale score can be multiplied by a weighting factor so that either the locale score or the link based locale score plays a larger role in determining the locale of the resource.

In some implementations, a link based locale score can be generated for a particular resource by calculating a ratio of a number of links to the resource from resources having a particular locale to a total number of links from all resources that link to the resource. In some implementations, each of the other resources can be identified as having a particular locale if the locale score of the other resource for the particular locale has a threshold value. The ratios for one or more localities can be used to determine one or more link based locale scores for one or more localities of the resource. In some implementations, the number of links from the other resources for a particular locale includes only distinct links to the resource. That is, only one link from a particular domain or IP address may be included in the calculation of the ratio.

Further, the ratio can be weighted by a factor that is based on the particular locale of the calculated ratio. For example, a locale having a large base of documents or resources and/or a strong basis for locale search, such as India, may have a high weighting factor.

In some implementations, the locale identification system 102 adjusts the position of one or more results within the ordered listing of results based on a user locale. In this way, the locale identification system 102 can present results that a user may consider to be more interesting at a higher position within the ordered listing of results. For example, the locale identification system 102 can promote results corresponding to domains having link based locale scores for the user's locale. Alternatively, the locale identification system 102 can promote domains having link based locale scores exceeding a specified threshold for the user's locale—for example, domains having locale scores for the user's locale at or above "0.7". Additionally or alternatively, the locale identification system 102 can promote results corresponding to domains having link based locale scores for locales sharing characteristics with the user's locale. For example, the locale identification system 102 can promote results corresponding to domains having link based locale scores for locales sharing a common language with the user's locale. In other implementations, the locale identification system 102 promotes results corresponding to global domains.

In some implementations, the locale identification system 102 demotes one or more results within the ordered listing of results. In this way, the system can decrease the number of results presented to a user that the user may find less interesting or overly cumulative. The locale identification system 102 can demote results corresponding to domains having link based locale scores for locales other than the user's locale. For example, if a search result for a Canadian user corresponds to a domain with a Germany link based locale score, the locale identification system 102 can presume that the Canadian user will find that result to be of little interest and can demote the result accordingly. The locale identification system 102 can also demote one or more results corresponding to global domains. For example, if "www.random.com" and "www.random.net" both appear in the search results, the system can decide to demote the result having the lower rank—the presumption being that a user would find the content on the second global domain to be substantially duplicative of content on the first.

The locale identification system 102 reorders the listing of results based on any promotions and demotions and presents the reordered results to the client 106.

For example, a user may be identified as having a particular locale, such as an India locale. The user may input a search request including the phrase "aaai." A typical search result might include web pages in the domain "www.aaai.org" for the Association for the Advancement of Artificial Intelligence. The "www.aaai.org" domain may have links directed to it from many other resources. These other resources that include links to "www.aaai.org" may have locale scores from many different localities. The result is that the "www.aaai.org" domain will have small contributions from link based local scores if there is a large number of resources that link to "www.aaai.org" where no individual locale has a large number of resources linking to "www.aaai.org."

Further, the search results may include a domain such as "www.aaaiindia.com" for Advertising Agencies Association of India. The "www.aaaiindia.com" domain may have a large number of resources linking to it which have high locale scores for the India locale. The resulting link based locale score of the "www.aaaiindia.com" domain provides a high contribution for the India locale. Correspondingly, the order of the search result for the "www.aaaiindia.com" domain is promoted in the list of search results as it has a link based locale score that matches a locale score of the user (e.g., for the India locale).

Figure 2:
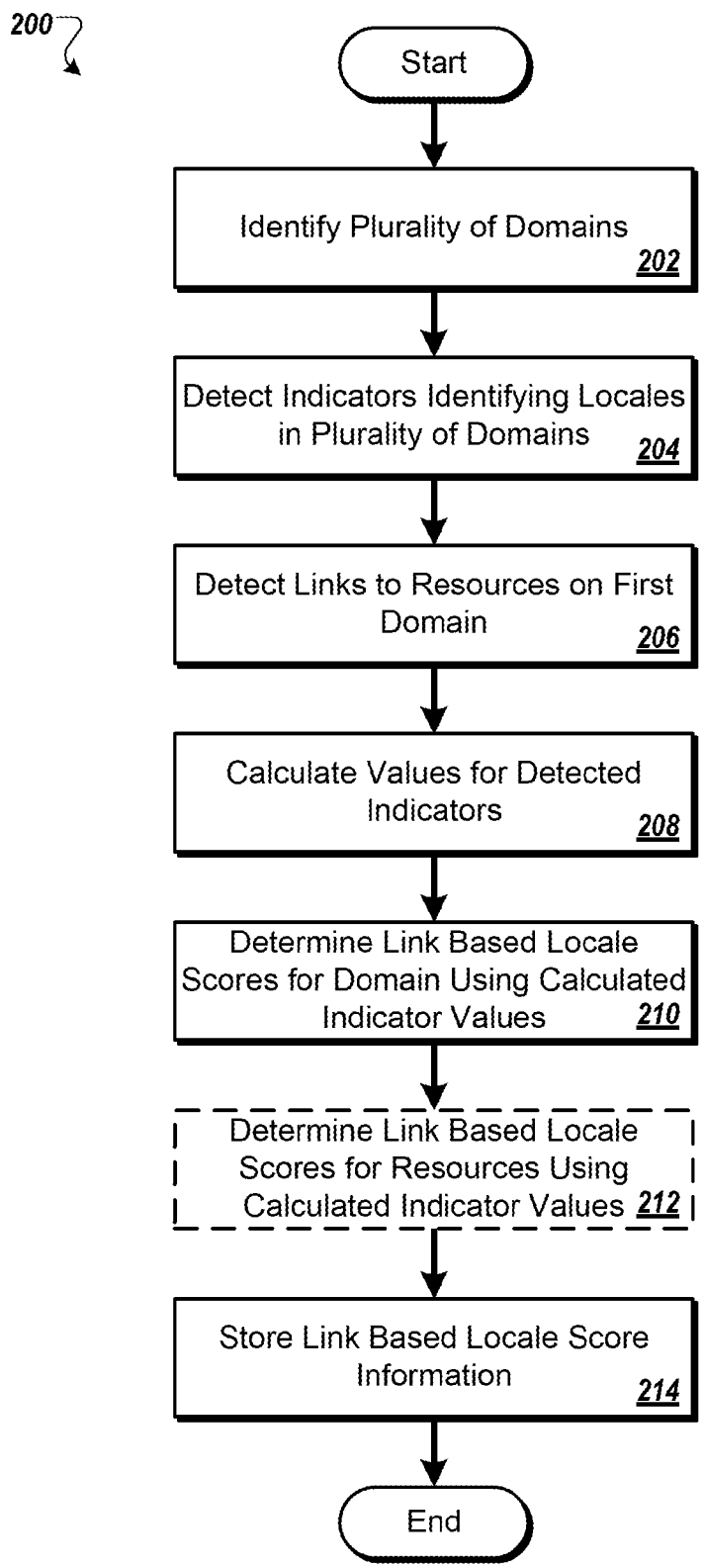
FIG. 2 shows an example method for determining link based locale scores.

FIG. 2 shows an example method 200 for determining link based locale scores. For convenience, the method will be described with reference to a computer system that performs the method (e.g., the locale identification system 102). The system identifies a plurality of domains 202. The plurality of domains 108 can be domains that are addressable through the network 104.

The system includes a locale detector that detects indicators identifying locales in a plurality of domains 204. The detected indicators can include both dynamic indicators and static indicators. In some implementations, the system identifies locales using only dynamic indicators or only static indicators. In other implementations, the system identifies locales using the static and dynamic indicators in combination. The system can apply a preference to dynamic or static indicators. For example, for a given domain, the system can initially detect dynamic indicators and can then detect static indicators only if an inadequate amount of dynamic information is available. Alternatively, the system can detect static indicators regardless of the amount of available dynamic information.

The system includes a link detector that detects links in the plurality of domains to one or more resources in a first domain 206. For example, the "www.domain.ca" domain 108a includes the resources 110. One or more of the resources 110 may include links to the "www.domain.co.uk" domain 108b.

The system calculates values for the detected indicators relative to other indicators in the same domain 208. In some implementations, the system applies one value to dynamic indicators and a different value to static indicators. For example, the system can apply higher values to dynamic indicators relative to static indicators. In this way, the system can prioritize dynamic information.

In some implementations, the system calculates indicator values based on the particular type of information included in an indicator. For example, the system can apply one value to dynamic indicators including user information (e.g., Webmaster feedback) and a different value to dynamic indicators including content information (e.g., anchor text). As an additional example, the system can apply one value to dynamic indicators including keywords explicitly identifying geographical locales and a different value to indicators including keywords characteristic to a locale.

In other implementations, the system calculates indicator values according to the quality or reliability of an indicator.

For example, the system can apply relatively low values to indicators including IP address information, on the premise that, alone, an IP address is not the most reliable indicator with respect to identifying a relevant locale. The system can also calculate indicator value according to the reliability of the information. The reliability of an indicator including a ccTLD name to identify a relevant locale can depend on policies of the country of registration, e.g., on whether the country requires an entity to reside within the country to obtain a registration. The system can accordingly calculate one value for an indicator including a ccTLD name of ".it" differently than, e.g., an indicator including a ccTLD name of ".be". In other implementations, the system scales the calculated indicator value according to the reliability of the information. For example, the reliability of an indicator including a ccTLD name can depend on policies of the country of registration, e.g., on whether a country requires an entity to reside within the country to obtain a registration. The system can scale a value for an indicator including a ccTLD name of ".it" differently than, e.g., an indicator including a ccTLD name of ".be".

In other implementations, the system calculates indicator values according to the quantity of information. For example, the system can calculate values for indicators including keyword information based on the total number of keywords contained in resource page text, e.g., can apply a higher value if the page text contains a greater number of keywords.

The system can use indicator values to account for errors inherent in the information associated with a particular indicator. In some implementations, the system applies a weight to data associated with an indicator and calculates the indicator value using the weighted data. For example, an indicator including user traffic data will contain error from users mistakenly clicking on a particular web page. The system can minimize the effect this error has on an indicator value by, for example, weighting user visits according to the amount of time a user spends on a page and calculating the indicator value using this weighted data.

In some implementations, the system calculates multiple indicator values for a single indicator corresponding to different locales identified by the indicator. For example, user click data for a certain domain might show that 80% of the user clicks are from users in the U.S. and 10% are from users in Germany. An indicator including the user click data information would, therefore, identify at least two locales to which the domain may be relevant: the U.S. and, to a lesser extent, Germany. To account for both of these relevant locales, the system can calculate two values for the user click data indicator, corresponding to the U.S. and Germany. Because the click data shows a strong correlation with the U.S., the system will calculate a relatively high U.S. value for the indicator. Conversely, because the click data shows a weak correlation with Germany, the system will calculate a relatively low Germany value for the indicator.

The system determines link based locale scores for the domain using the calculated indicator values 210. The system can determine multiple link based locale scores for a single domain. In some implementations, the system determines a separate link based locale score for each locale identified by indicators included in the resources that link to the domain. For example, if the resources that link to a domain include indicators identifying Germany, Japan, and the U.S., the system calculates three link based locale scores for the domain. A domain's link based locale scores can be—and often will be—different for each locale. If the resources linking to the above domain include indicators strongly identifying Japan and weakly identifying the U.S. and Germany, for example, the domain will have a relatively high Japan link based locale score and relatively low U.S. and Germany link based locale scores.

In other implementations, the system determines link based locale scores only for certain locales identified by indicators in the resources that link to the domain. The system can determine link based locale scores only for locales identified by indicators whose values exceed a specified threshold. For example, if an indicator identifying Germany is relatively weak (e.g., has an indicator value of "0.2" relative to other indicators in the resources) the system can choose to not determine a Germany link based locale score for the domain. In other implementations, the system can determine link based locale scores only if the resources include a certain number of indicators identifying a locale or if the indicators meet a certain reliability threshold. In this way, the system can avoid determining link based locale scores for locales that the domain is not relevant to.

The system calculates a domain's link based locale score for a particular locale using the values of indicators in the resources that identify that locale. In some implementations, the system equates the link based locale score with the highest indicator value. In other implementations, the system aggregates one or more indicator values to determine the link based locale score. For example, the system can calculate an average or a sum of the values for all indicators in the resources identifying a particular locale.

In other implementations, the system determines a domain's link based locale score by assigning weights to one or more indicator values from the resources according to various criteria, and aggregating the weighted values. In some implementations, the system uses the weight to modify the indicator value, such as by multiplying the indicator value by the weight. The system can assign weights according to a presumed reliability of indicator data. For example, the system can presume indicators including explicit user feedback will be more reliable than indicators including user click data and, accordingly, can weight values the former more heavily than the latter. Similarly, the system can presume that the reliability of indicators including ccTLD name information varies based on the country of registration and can weight indicator values accordingly. The system can weight static and dynamic indicator values differently, e.g., can weight values for dynamic indicators more heavily than for static.

The system can deemphasize indicators (e.g., can apply low weights or ignore the indicators) if the indicators are unreliable, unnecessarily cumulative, or include purely static information. In some implementations the system applies a zero weight to indicators including IP information if the domain also includes indicators that the system presumes to be more reliable, e.g., dynamic indicators. In other implementations the system deemphasizes conflicting indicators, i.e., indicators identifying a different locale than other indicators on the same domain. For example, if a domain's IP information identifies the U.S. but resource content identifies Australia, the system can deemphasize or ignore the IP information (e.g., according to a presumption of unreliability). In this way, the system can ignore indicators that erroneously identify locales to which a domain is relevant.

The system can apply a preference to values for dynamic indicators in determining locale scores. In some implementations, the system determines link based locale scores by aggregating only dynamic indicator values. In other implementations, the system deemphasizes static indicator values (i.e., weights static indicator values less heavily than dynamic indicator values) and determines link based locale scores by aggregating dynamic and static indicator values. In other implementations, static indicator values can be used to refine previously-calculated link based locale scores based on dynamic indicator values. For example, link based locale scores can be refined based on static indicator values if the system determines that insufficient dynamic information is available or additional accuracy is desired.

Optionally, the system determines link based locale scores for one or more of the domain's resources using the calculated indicator values 212. In some implementations, the system uses indicator values associated with a resource to determine the resource's locale scores, in a manner similar to that described above for domains. A resource can have the same link based locale scores as its parent domain, e.g., if the resource includes the same set of indicators from resources linking to it as the parent domain. Alternatively, the resource can have different link based locale scores from its parent domain. For example, a domain including content relating to an international organization may have multiple link based locale scores for various countries in which it has a business presence. In contrast, a locale-specific resource on the domain—for example, a homepage for the organization's branch in Germany having only German resources linking to it—may have only a single link based locale score, i.e., for Germany.

As with domains, each resource can have multiple link based locale scores corresponding to the locales identified by indicators in resources that link to the resource. Additionally, different resources in the same parent domain can have different link based locale scores. For example, web pages on a domain corresponding to an organization's U.S. and Germany homepages, respectively, will most likely have different U.S. and Germany link based locale scores.

In some implementations, the system automatically assigns link based locale scores to resources in a domain. For example, the system can assign a resource link based locale scores corresponding to the link based locale scores for its parent domain. Referring to FIG. 1, if the "www.domain.ca" domain 108a has a U.S. link based locale score of "0.8" and a Germany link based locale score of "0.4", the system can assign identical U.S. and Germany link based locale scores to each of the resources 110.

The system stores the link based locale score information 214. The system can store link based locale score information in, for example, an index. Optionally, the system can repeat the method 200 periodically, in order to accurately identify locales currently associated with the domains or resources.

Table 1 illustrates locale score information that a system can determine for multiple domains according to the method 200. Domains "www.result.co.uk", "www.result.de", and "www.result.ca" are local domains relevant to one or more particular locales. Domains "www.result.com" and "www.result.net", in contrast, are global domains. The system detects indicators included in resources that link to the domains that identify locales, calculates values for the indicators, and uses the calculated indicator values to determine link based locale scores for each domain.

Table 1 includes local domains "www.result.co.uk", "www.result.de", and "www.result.ca". Domain "www.result.co.uk" has resources linking to it that contain indicators identifying only one locale, the U.K. Indicators in resources linking to the "www.result.de" domain identify Germany and the U.S., and indicators in resources linking to the "www.result.ca" domain identify Canada, France, and the U.K. The system calculates indicator values indicating the reliability and quality of each indicator, as well as the strength with which the indicator identifies each particular locale.

TABLE 1

| Domains | Identified Locales in Resources Linking to the Domains | Link Based Locale Scores |
|---|---|---|
| www.result.co.uk | U.K. | 0.8 (U.K.) |
| www.result.com | U.S. | N/A |
|  | U.K. |  |
|  | Germany |  |
|  | Canada |  |
|  | Australia |  |
| www.result.net | — | N/A |
| www.result.de | Germany | 0.9 (Germany) |
|  | U.S. | 0.6 (U.S.) |
| www.result.ca | Canada | 0.8 (Canada) |
|  | France | N/A |
|  | U.K. | 0.7 (U.K.) |

The system determines link based locale scores for each domain using the calculated indicator values. Link based locale scores will be higher or lower according to, e.g., the reliability and strength of an indicator as reflected by its calculated values. For example, the relatively high "0.8" U.K. link based locale score for "www.result.co.uk", can reflect relatively reliable or numerous U.K.-identifying indicators. Domains having resources linking to them that contain indicators identifying multiple locales can have different link based locale scores for each identified locale. For example, the Germany indicators in resources linking to the "www.result.de" domain may be more reliable than the U.S. indicators, resulting in a relatively high "0.9" Germany score and a lower "0.6" U.S. score.

The system can decide to not determine a link based locale score if the corresponding indicator values do not exceed a specified threshold. For example, the system determines Canada and U.K. link based locale scores for "www.result.ca" of "0.8" and "0.7", respectively, but decides not to determine a France link based locale score due to a low number of France-identifying indicators in the resources linking to the "www.result.ca" domain.

Table 1 also includes global domains "www.result.com" and "www.result.net". The system can designate "www.result.com" and "www.result.net" as global domains using the locales identified by indicators in resources that link to the domains. For example, the system can designate domains or resources associated with a number of locales greater than five as global domains or resources. Additionally, the system can designate domains or resources unassociated with any locales as global if the domains have generic TLD names. According to these criteria, the system designates "www.result.com" (associated with five locales from resources that link to "www.result.com") and "www.result.net" (associated with zero locales from resources that link to "www.result.net") as global domains.

Because global domains are, by definition, not relevant to any particular locale (or, alternatively, are equally relevant to all locales), the system does not determine link based locale scores for either of the global domains.

Figure 3:
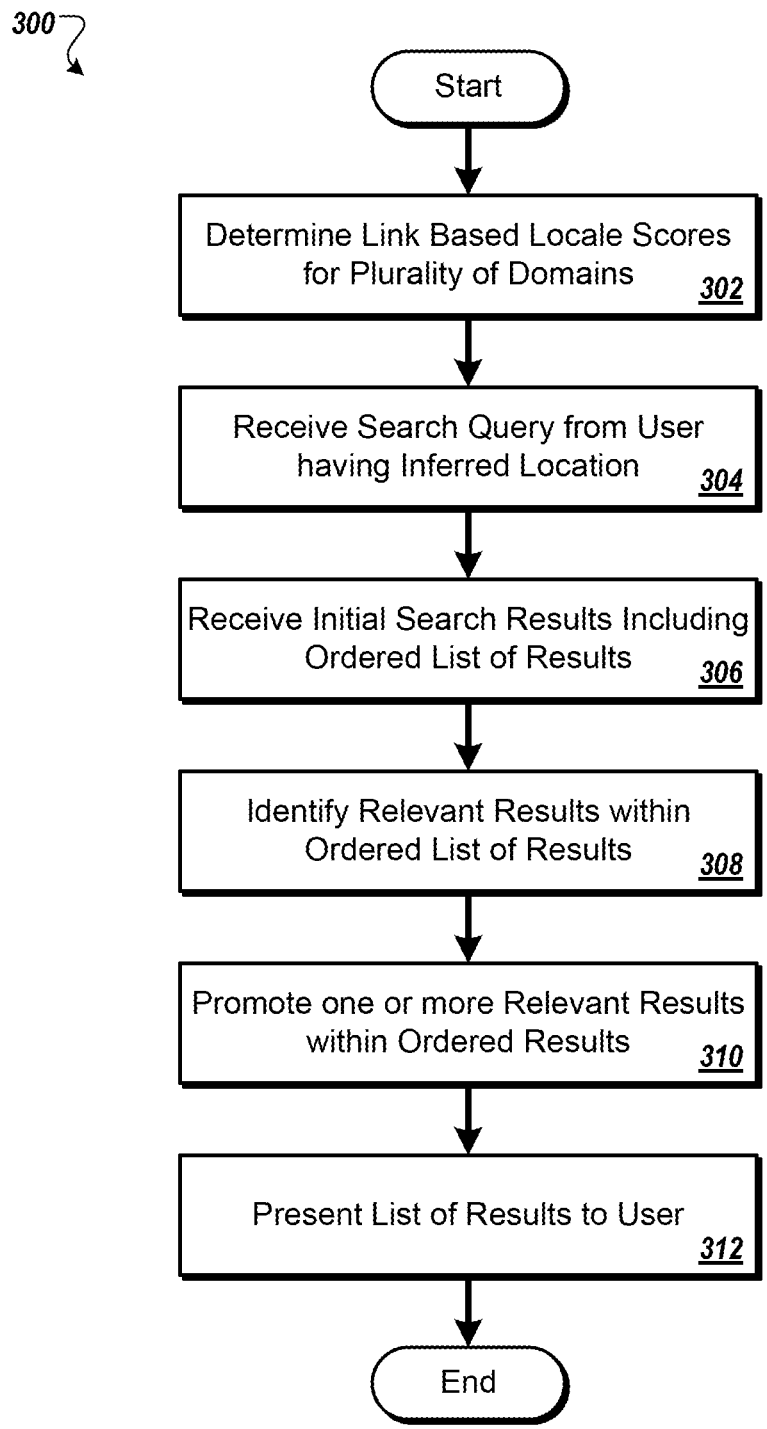
FIG. 3 an example method for using link based locale scores to promote domains within an ordered list of search results.

FIG. 3 shows an example method 300 for using link based locale scores to promote domains within an ordered list of search results. For convenience, the method 300 will be described with reference to a computer system that performs the method. The system determines link based locale scores for a plurality of domains 302. The system can determines link based locale scores using, for example, the method 200 shown in FIG. 2.

The system receives a search query from a user having an inferred location 304. The user's location is a locale in which the user is likely to be located or a locale in which the user is likely to be interested. The system can infer the user's location from information associated with or provided by the user, as described above.

The system can use a user's online history or personal information to determine the user's likely interest in a locale. In some implementations, the system identifies resources the user has previously accessed or received in connection with search queries and can infer that the user is interested in locales associated with these resources. In other implementations, the system identifies domains that the user accesses frequently or has accessed recently, and infers user interest in these domains. For example, if a user has recently visited web pages on domains having the ccTLD name ".br", the system can determine that Brazil is a locale of interest for the user. In other implementations, the system detects locales identified by information in the user's online account or profile, e.g., locales relevant to the user's travel history or online purchases. For example, the system can identify Japan as a locale of interest for a user who has previously ordered items from Japan.

In some implementations, the system identifies multiple locales for a user based on the user's projected interest in multiple locales. The system can identify primary and secondary locales for a particular user according to various criteria. For example, the system can designate that the locale in which the user is likely to be located is the user's primary locale. The system can additionally designate locales likely to be of interest to the user as being the user's secondary locales. According to these criteria, for a user issuing a search query from "www.google.ca", the system would designate a primary locale as Canada. If the user's browser has frequently accessed travel web pages associated with Brazil and France, the system would additionally designate the U.K. and France as secondary locales for the user.

In some implementations, the system identifies secondary locales based on, for example, geographical or cultural connections between the locale and another of the user's locales. For example, the system can designate the U.S. and Canada as being mutually interesting locales, based on geographical proximity. For the above Canadian user, the system can designate Canada as the primary locale and the U.S. as a secondary locale. Similarly, the system can designate Canada and the U.K. as being mutually interesting locales, based on the countries' political and historical connections. The system can therefore identify the U.K. as an additional secondary locale for the Canadian user.

The system receives initial search results including an ordered list of results 306. The system receives the search results, for example, from one or more dedicated search engines that generate search results in response to user search queries.

The system identifies relevant results within the ordered list of results 308. A result is considered "relevant" if the result corresponds to a domain having a link based locale score for one of the user's locales. In some implementations, the system accesses domain link based locale score information using an index containing previously-calculated locale information. In other implementations, the system identifies domain link based locale scores in real-time after receiving search results for a particular user query. For example, the system can determine link based locale scores only for those domains corresponding to results responsive to a particular search query.

The system can identify a limited number of relevant results. For example, the system can identify only those results appearing on the first page of search results. The system can identify only results corresponding to the user's primary locale, or can identify only a certain number of results corresponding to secondary locales. Alternatively, the system can identify all relevant results within the full listing of search results.

The system promotes one or more of the relevant results within the ordered results 310. For example, the system can identify results corresponding to domains having locale scores for Canada, the U.S., and the U.K. as relevant results for a Canadian user. The system can promote these results within the ordered listing of results by advancing the rank of the result (i.e., the ordinal position of the result in the list of results). An example technique of promoting results with respect to a user locale is described in co-pending and commonly owned U.S. patent application Ser. No. 11/781,847, entitled "IDENTIFYING AFFILIATED DOMAINS," filed Jul. 23, 2007, which is herein incorporated by reference.

In some implementations, relevant results are promoted according to the link based locale scores of the corresponding domains. For example, results corresponding to domains having higher link based locale scores can be promoted by a greater amount than results corresponding to domains having lower link based locale scores. In other implementations, results corresponding to domains having link based locale scores for a user's primary locale can be promoted by a greater amount than results corresponding to domains having link based locale scores for secondary locales. In this way, the system can apply the greatest promotion to domains likely to be the most relevant to the user's locale.

In other implementations, the system promotes relevant results by a certain number of positions within the ordered list of results. For example, the system can promote all relevant results by a standard number of positions, e.g., by five positions. The system can promote a result to a specific page of results, e.g., the initial page. Additionally or alternatively, the system can promote a result by a sufficient number of positions such that the result is ranked above other results not identified as being relevant.

In some implementations, the system conserves the rank of one or more results within the list so that their ranks are not affected by the promotion of relevant results. In some implementations, the system conserves the rank of global results, e.g., results corresponding to global domains. In other implementations, the system promotes one or more global results. In this way, the system can promote results that may still be of interest to a user, despite not being specifically relevant to the user's locale.

In some implementations, the system promotes all relevant results. In other implementations, the system promotes only certain relevant results. The system can promote a specified number of results, e.g., the five most highly-ranked relevant results. Additionally or alternatively, the system can promote results according to the link based locale scores of corresponding domains. For example, the system can promote only results corresponding to domains having link based locale scores above a threshold value. In this way, the system can promote only results that are strongly relevant to a locale.

In some implementations, the system ensures that results are not promoted above other results displaying a higher degree of relevance to the user location. For example, a system that generally promotes relevant results by five places can decide to promote a result having a link based locale score of "0.7" by only four positions, if the promotion would otherwise place the result above a more relevant result (e.g., a result having a locale score of "0.9"). In this way, the system can ensure that results having a higher level of relevance appear at correspondingly higher ranks in the list of results.

The system can identify domains having link based locale scores for primary locales and secondary locales. The system can promote results corresponding to domains associated with primarily locales by a greater amount than results corresponding to domains associated with secondary locales. Additionally or alternatively, the system can promote a lesser number of results corresponding to domains associated with secondary locales. For example, if the system promotes a large number of results corresponding to domains associated with primary locales, the system can accordingly promote a lesser number of results associated with secondary locales. Thus, the system can prioritize results that are likely to be of primary interest to the user. Alternatively, the system can promote an equal number of results associated with primary and with secondary locales. Thus, the system can present a greater variety of interesting results to a user.

Optionally, the system demotes one or more results within the ordered list of results 312. The system can demote results corresponding to domains having link based locale scores for locales not associated with the user. Alternatively, the system can demote results corresponding to global domains. In a manner analogous to that for promotions, described above, the system can demote a result to a specific subsequent page of results, or by a certain number of positions within the ordered list. The system presents the list of results to the user 314. The final ordering of the listed results includes the various promotions, demotions, and rankings produced by the method 300.

Figure 4A:
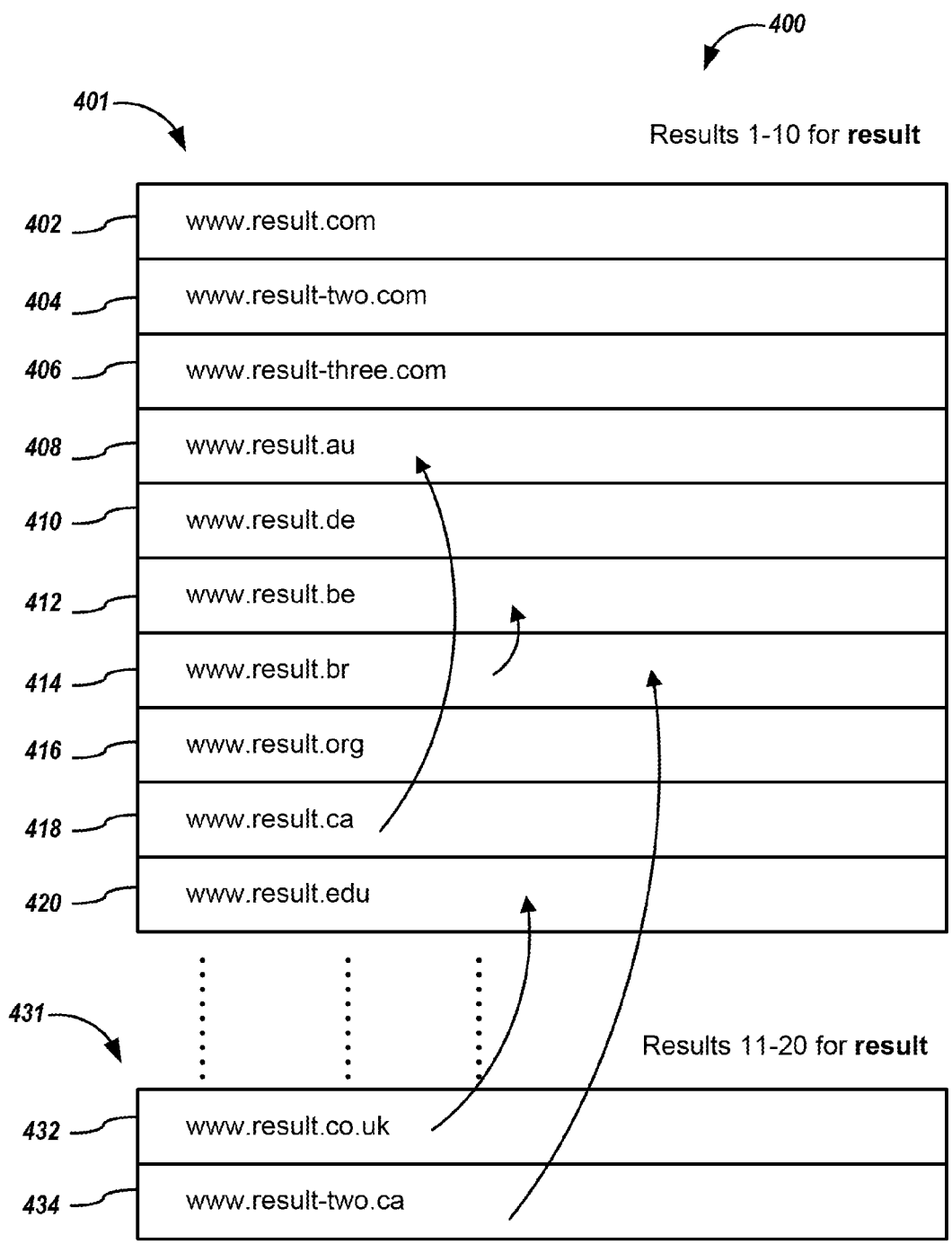
FIGS. 4A and 4B show a list illustrating example search results corresponding to domains having identified link based locale scores.
Figure 4B:
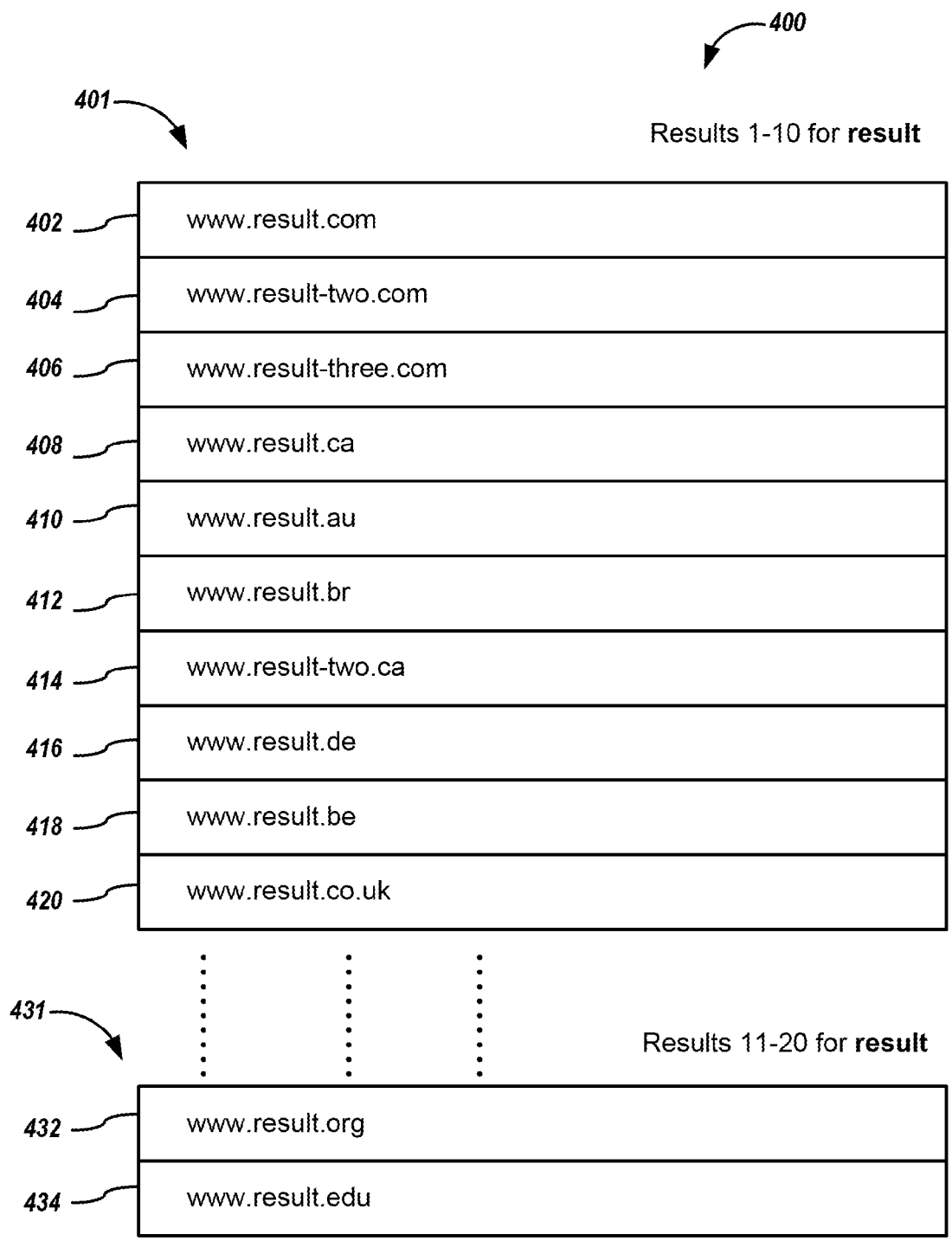

FIGS. 4A and 4B show a list 400 illustrating example search results corresponding to domains having identified locale scores. The list 400 includes results responsive to a user query for 'result.' The results include a list 401 and a list 431. Each result corresponds to a particular domain (e.g., the domain "www.result.ca"). The list 401 is a first page of results corresponding to multiple domains 402, 404, 406, 408, 410, 412, 414, 416, 418, and 420. The list 431 is a second page of results (not fully shown) corresponding to multiple domains 432 and 434. The user has an inferred locale which, for purposes of illustration, is taken to be Canada.

FIGS. 4A and 4B can be used to illustrate the method 300. The system infers that the user is geographically located in Canada. The system therefore identifies Canada as the user's primary locale. The system identifies the U.K. and Brazil as secondary locales according to criteria such as those described above: the U.K.'s political connections to Canada, for example, and Brazil's relevance to the user's travel interests and/or online history. The system receives the list 400 of search results in response to the user query. The system selects results within the first two pages of the list 400 for which link based locale scores have been previously determined (e.g., using the method 200). The system then identifies results corresponding to domains having link based locale scores relevant to the user location, i.e., locale scores for Canada, the U.K., and Brazil. The system selects results "www.result.ca" 418 and "www.result-two.ca" 434 as relevant to Canada, i.e., to the primary locale of the user. The system further selects results "www.result.br" 414 and "www.result.co.uk" 432 as relevant to Brazil and the U.K. respectively, i.e., to the secondary locales of the user.

The system promotes the selected results within the list 400 according to any of the various heuristics described above. For example, the system can promote each selected result associated with the primary locale, Canada, by five positions, and can promote each selected result associated with the secondary locales, the U.S. or the U.K., by one position.

Referring to FIG. 4B, the system presents the final ordering of the listed results including the various promotions, demotions, and rankings produced by the method 300. It should be noted that the system can conserve the ranks of one or more results corresponding to global domains in the final ordering of results. For example, the system conserves the ranks of the three most highly-ranked global results, i.e., results "www.result.com" 402, "www.result-two.com" 404, and "www.result-three.com" 406, so that their positions are unchanged by the promotions and reordering.

Figure 5:
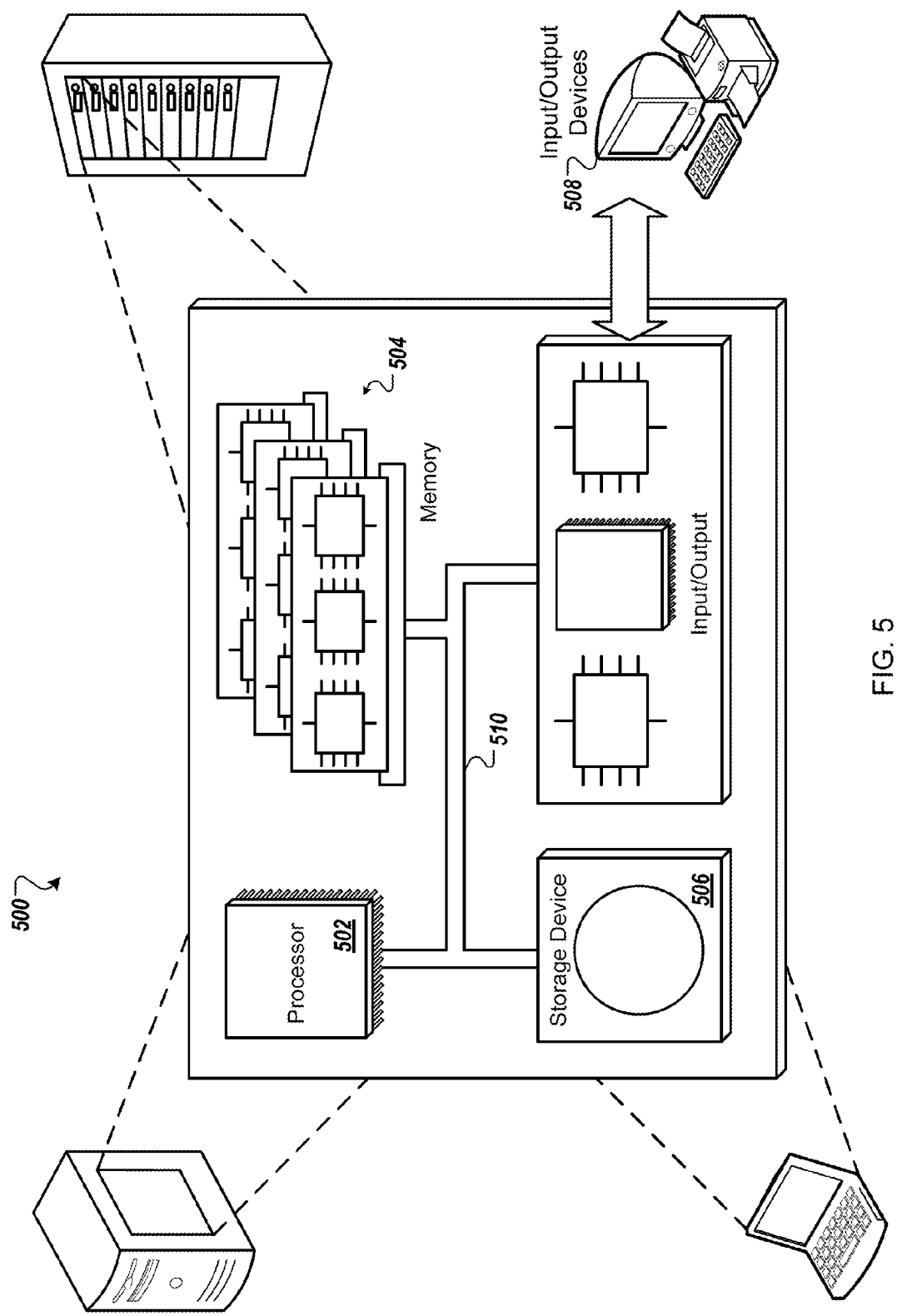
FIG. 5 is a schematic diagram showing an example of a generic computing system that can be used in connection with computer-implemented methods described in this document.

FIG. 5 is a schematic diagram of a generic computing system 500. The generic computing system 500 can be used for the operations described in association with any of the computer-implement methods described previously, according to one implementation. The generic computing system 500 includes a processor 502, a memory 504, a storage device 506, and an input/output device 508. Each of the processor 502, the memory 504, the storage device 506, and the input/output device 508 are interconnected using a system bus 510. The processor 502 is capable of processing instructions for execution within the generic computing system 500. In one implementation, the processor 502 is a single-threaded processor. In another implementation, the processor 502 is a multi-threaded processor. The processor 502 is capable of processing instructions stored in the memory 504 or on the storage device 506 to display graphical information for a user interface on the input/output device 508.

The memory 504 stores information within the generic computing system 500. In one implementation, the memory 504 is a computer-readable medium. In one implementation, the memory 504 is a volatile memory unit. In another implementation, the memory 504 is a non-volatile memory unit.

The storage device 506 is capable of providing mass storage for the generic computing system 500. In one implementation, the storage device 506 is a computer-readable medium. In various different implementations, the storage device 506 may be a floppy disk device, a hard disk device, an optical disk device, or a tape device.

The input/output device 508 provides input/output operations for the generic computing system 500. In one implementation, the input/output device 508 includes a keyboard and/or pointing device. In another implementation, the input/output device 508 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   identifying a plurality of domains including a first domain and one or more second domains, the second domains including one or more second resources that contain one or more hyperlinks that refer to a respective resource included in the first domain;
   detecting a plurality of indicators in the second resources, the indicators collectively identifying a plurality of locales, wherein detecting the indicators in the second resources comprises identifying locales of users that click on the second resources;
   calculating one or more link based locale scores using a plurality of the detected indicators in the second resources included in the second domains, wherein each link based locale score is a score for a corresponding geographic area;
   calculating a one or more locale scores for the first domain by calculating first values for indicators in one or more first resources of the first domain, wherein each of the one or more locale scores for the first domain is a score for a corresponding geographic area;
   combining the locale scores for the first domain with the link based locale scores to create one or more combined scores, wherein each combined score is a score for a corresponding geographic area that combines the corresponding locale score for the first domain and the link based locale score for that geographic area; and
   wherein identifying, detecting, calculating and combining are performed by one or more computers.

2. The method of claim 1 wherein calculating the link based locale scores includes calculating second values for the plurality of the detected indicators in the second resources and determining the link based locale scores for the second resources based at least in part on the second values.

3. The method of claim 2 wherein calculating the second values for a particular second resource of the second resources comprises combining the second values for the particular second resource.

4. The method of claim 3 wherein combining the second values for the particular second resource comprises applying a weight to one or more of the second values.

5. The method of claim 1 further comprising receiving a search query from a client device, and adjusting a position of a first resource of the first resources in an ordered list of search results based on the combined score and an inferred locale of the client device.

6. The method of claim 1 wherein detecting the indicators in the second resources comprises detecting the indicators in dynamic traffic data for a plurality of client devices on the second domain.

7. The method of claim 1 wherein detecting the indicators in the second resources comprises detecting the indicators in a dynamic explicit identification of one or more locales.

8. The method of claim 1 wherein detecting the indicators in the second resources comprises detecting the indicators in content associated with the second resources.

9. The method of claim 1, further comprising:
   receiving an initial search output resulting from a search query obtained from a client device, the search output including an ordered list of search results, each result in the ordered list of search results corresponding to a domain, the client device having an inferred locale;
   identifying domains within the ordered list of search results for which link based locale scores have been determined; and
   adjusting a position of one or more of the members of the ordered list of search results corresponding to the identified domains within the ordered list of search results based on the inferred locale of the client device.

10. A system comprising:
    one or more computers programmed to perform operations comprising:
    identifying a plurality of domains including a first domain and one or more second domains, the second domains including one or more second resources that contain one or more hyperlinks that refer to a respective resource included in the first domain;

detecting a plurality of indicators in the second resources, the indicators collectively identifying a plurality of locales, wherein detecting the indicators in the second resources comprises identifying locales of users that click on the second resources;

calculating one or more link based locale scores using a plurality of the detected indicators in the second resources included in the second domains, wherein each link based locale score is a score for a corresponding geographic area;

calculating a one or more locale scores for the first domain by calculating first values for indicators in one or more first resources of the first domain, wherein each of the one or more locale scores for the first domain is a score for a corresponding geographic area; and combining the locale scores for the first domain with the link based locale scores to create one or more combined scores, wherein each combined score is a score for a corresponding geographic area that combines the corresponding locale score for the first domain and the link based locale score for that geographic area.

11. The system of claim 10 wherein calculating the link based locale scores includes calculating second values for the plurality of the detected indicators in the second resources and determining the link based locale scores for the second resources based at least in part on the second values.

12. The system of claim 11 wherein calculating the second values for a particular second resource of the second resources comprises combining the second values for the particular second resource.

13. The system of claim 12 wherein combining the second values for the particular second resource comprises applying a weight to one or more of the second values.

14. The system of claim 10 further comprising receiving a search query from a client device, and adjusting a position of a first resource of the first resources in an ordered list of search results based on the combined score and an inferred locale of the client device.

15. The system of claim 10 wherein detecting the indicators in the second resources comprises detecting the indicators in dynamic traffic data for a plurality of client devices on the second domain.

16. The system of claim 10 wherein detecting the indicators in the second resources comprises detecting the indicators in a dynamic explicit identification of one or more locales.

17. The system of claim 10 wherein detecting the indicators in the second resources comprises detecting the indicators in content associated with the second resources.

18. The system of claim 10, wherein the operations further comprise:
receiving an initial search output resulting from a search query obtained from a client device, the search output including an ordered list of search results, each result in the ordered list of search results corresponding to a domain, the client device having an inferred locale;
identifying domains within the ordered list of search results for which link based locale scores have been determined; and
adjusting a position of one or more of the members of the ordered list of search results corresponding to the identified domains within the ordered list of search results based on the inferred locale of the client device.

19. A storage device having instructions stored thereon that, when executed by one or more computers, cause the one or more computers to perform operations comprising:
identifying a plurality of domains including a first domain and one or more second domains, the second domains including one or more second resources that each contain one or more hyperlinks that refer to a respective resource included in the first domain;
detecting a plurality of indicators in the second resources, the indicators collectively identifying a plurality of locales, wherein detecting the indicators in the second resources comprises identifying locales of users that click on the second resources;
calculating one or more link based locale scores using a plurality of the detected indicators in the second resources included in the second domains, wherein each link based locale score is a score for a corresponding geographic area;
calculating a one or more locale scores for the first domain by calculating first values for indicators in one or more first resources of the first domain, wherein each of the one or more locale scores for the first domain is a score for a corresponding geographic area; and
combining the locale scores for the first domain with the link based locale scores to create one or more combined scores, wherein each combined score is a score for a corresponding geographic area that combines the corresponding locale score for the first domain and the link based locale score for that geographic area.

20. The storage device of claim 19 wherein calculating the link based locale scores includes calculating second values for the plurality of the detected indicators in the second resources and determining the link based locale scores for the second resources based at least in part on the second values.

21. The storage device of claim 20 wherein calculating the second values for a particular second resource of the second resources comprises combining the second values for the particular second resource.

22. The storage device of claim 21 wherein combining the second values for the particular second resource comprises applying a weight to one or more of the second values.

23. The storage device of claim 19 further comprising receiving a search query from a client device, and adjusting a position of a first resource of the first resources in an ordered list of search results based on the combined score and an inferred locale of the client device.

24. The storage device of claim 19 wherein detecting the indicators in the second resources comprises detecting the indicators in dynamic traffic data for a plurality of client devices on the second domain.

25. The storage device of claim 19 wherein detecting the indicators in the second resources comprises detecting the indicators in a dynamic explicit identification of one or more locales.

26. The storage device of claim 19 method of claim 1 wherein detecting the indicators in the second resources comprises detecting the indicators in content associated with the second resources.

27. The storage device of claim 19, wherein the operations further comprise:
receiving an initial search output resulting from a search query obtained from a client device, the search output including an ordered list of search results, each result in the ordered list of search results corresponding to a domain, the client device having an inferred locale;

identifying domains within the ordered list of search results for which link based locale scores have been determined; and adjusting a position of one or more of the members of the ordered list of search results corresponding to the identified domains within the ordered list of search results based on the inferred locale of the client device.

* * * * *

UNITED STATES PATENT AND TRADEMARK OFFICE
CERTIFICATE OF CORRECTION

PATENT NO. : 8,788,490 B1
APPLICATION NO. : 12/492836
DATED : July 22, 2014
INVENTOR(S) : Abhiman Chatra and Sreeram Ramachandran Page 1 of 1

It is certified that error appears in the above-identified patent and that said Letters Patent is hereby corrected as shown below:

In the Claims:

In Claim 26, column 22, line 57, after "claim 19" delete "method of claim 1".

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,788,490 B1 |
| APPLICATION NO. | : 12/492836 |
| DATED | : July 22, 2014 |
| INVENTOR(S) | : Chatra et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this
Eighth Day of March, 2016

Michelle K. Lee
*Director of the United States Patent and Trademark Office*